United States Patent
Ferry et al.

(10) Patent No.: US 11,306,415 B2
(45) Date of Patent: Apr. 19, 2022

(54) PROCESS FOR PRODUCING A NON-WOVEN FABRIC

(71) Applicant: ExxonMobil Chemical Patents Inc., Baytown, TX (US)

(72) Inventors: William M. Ferry, Houston, TX (US); Luis A. Sotomayor, Houston, TX (US); Gregory E. Keys, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 370 days.

(21) Appl. No.: 16/307,516

(22) PCT Filed: Apr. 19, 2017

(86) PCT No.: PCT/US2017/028267
§ 371 (c)(1),
(2) Date: Dec. 6, 2018

(87) PCT Pub. No.: WO2018/017169
PCT Pub. Date: Jan. 25, 2018

(65) Prior Publication Data
US 2020/0010982 A1 Jan. 9, 2020

Related U.S. Application Data

(60) Provisional application No. 62/365,765, filed on Jul. 22, 2016.

(30) Foreign Application Priority Data

Sep. 12, 2016 (EP) .................................... 16188234

(51) Int. Cl.
| | |
|---|---|
| D01D 5/088 | (2006.01) |
| D01D 5/098 | (2006.01) |
| D01D 5/14 | (2006.01) |
| D06C 7/00 | (2006.01) |
| D06C 15/00 | (2006.01) |
| D06C 15/02 | (2006.01) |
| D01F 6/06 | (2006.01) |
| B32B 5/02 | (2006.01) |
| B32B 5/26 | (2006.01) |
| D01F 6/30 | (2006.01) |
| D01F 6/46 | (2006.01) |
| D04H 3/007 | (2012.01) |
| D01D 5/08 | (2006.01) |

(52) U.S. Cl.
CPC ............... D01F 6/06 (2013.01); B32B 5/022 (2013.01); B32B 5/26 (2013.01); D01D 5/08 (2013.01); D01F 6/30 (2013.01); D01F 6/46 (2013.01); D04H 3/007 (2013.01); *B32B 2262/0253* (2013.01); *D01D 5/0985* (2013.01); *D10B 2321/022* (2013.01)

(58) Field of Classification Search
CPC .......... D01D 5/08; D01D 5/088; D01D 5/098; D01D 5/0985; D01D 5/14; D01F 6/46; D04H 3/007; D06C 7/00; D06C 15/00; D06C 15/02; D10B 2321/022
USPC ........ 264/103, 210.8, 211.13, 211.18, 211.2, 264/234, 237, 331.17, 555
See application file for complete search history.

(56) References Cited

U.S. PATENT DOCUMENTS

| | | | |
|---|---|---|---|
| 5,244,482 A | 9/1993 | Hassenboehler, Jr. et al. | |
| 5,707,468 A * | 1/1998 | Arnold ..................... | D04H 3/14 |
| | | | 156/180 |
| 5,723,217 A | 3/1998 | Stahl et al. | |
| 6,228,951 B1 | 5/2001 | Hirota et al. | |
| 6,338,814 B1 * | 1/2002 | Hills ....................... | D01D 5/098 |
| | | | 264/555 X |
| 6,506,873 B1 | 1/2003 | Ryan et al. | |
| 8,013,093 B2 | 9/2011 | Datta et al. | |
| 8,101,534 B2 | 1/2012 | Dharmarajan et al. | |
| 9,994,982 B2 | 6/2018 | Chester et al. | |
| 2003/0118816 A1 | 6/2003 | Polanco et al. | |
| 2004/0038022 A1 * | 2/2004 | Maugans .................. | D01F 6/46 |
| | | | 428/328 |
| 2008/0057308 A1 | 3/2008 | Polato et al. | |
| 2009/0124154 A1 | 5/2009 | Harrington et al. | |
| 2011/0065867 A1 | 3/2011 | Keung et al. | |
| 2012/0329351 A1 | 12/2012 | Mehta et al. | |
| 2013/0137331 A1 | 5/2013 | Richeson | |
| 2015/0119515 A1 | 4/2015 | Frei et al. | |

FOREIGN PATENT DOCUMENTS

| | | |
|---|---|---|
| CN | 103088552 A | 3/2013 |
| WO | 97/07274 A | 2/1997 |
| WO | 2010/087921 A | 8/2010 |

* cited by examiner

*Primary Examiner* — Leo B Tentoni
(74) *Attorney, Agent, or Firm* — Vorys, Sater, Seymour and Pease LLP

(57) ABSTRACT

A process for producing a nonwoven fabric comprising forming a polymer composition comprising a primary polypropylene and at least one secondary polyolefin; in a spunbond process, forming fibers then fabric from the polymer composition; and exposing the fabric to an heating environment within a range from 50° C. to 250° C.

14 Claims, No Drawings

PROCESS FOR PRODUCING A NON-WOVEN FABRIC

CROSS-REFERENCE OF RELATED APPLICATIONS

This application is a National Phase Application claiming priority to PCT Application Serial No. PCT/US2017/028267 filed Apr. 19, 2017, which claims priority to U.S. Provisional Application Ser. No. 62/365,765 filed Jul. 22, 2016 and European Application No. 16188234.5 filed Sep. 12, 2016, the disclosures of which are fully incorporated herein by their reference.

FIELD OF THE INVENTION

The disclosure relates to propylene-based fibers and nonwoven fabrics therefrom, and more particularly to propylene-based fibers having increased thermal shrinkage.

BACKGROUND OF THE INVENTION

Synthetic fibers and nonwoven fabrics often lack a soft feel or "hand" like natural fibers and fabrics. The different aesthetic feeling is due to the lack of "loft" or "bulk" in synthetic materials, that is, a space-filling characteristic of natural fibers. Natural fibers are often not planar materials, and rather they exhibit some crimp or texture in three-dimensions that allow for space between fibers. Natural fibers can often be laid onto a plane and have a surface projecting from that plane, which are "3-dimensional." Synthetic fibers are essentially planar, thus lacking the loft and feel of natural fibers. There are a number of methods to impart "bulkiness" or "loft" to synthetic fibers or fabrics, including mechanical treatments such as crimping, air jet texturing, or pleating. These methods are not generally easily applicable to spunbond nonwoven fabrics in cost-effective ways. Using "bicomponent" fibers that include two dissimilar polymers arranged in an organized spatial arrangement such as "side-by-side" or "sheath and core" within individual fibers can provide a route to "self-crimping" fibers if the two dissimilar components can be treated in a manner, for example, heating, that causes differential shrinkage of the components. However, production of such bicomponent fibers requires complex equipment.

It is desired to provide a method in which spunbond fabrics or laminates containing spunbond fibers and be produced which increases the "loft" or "bulk" of the fabric or laminate without the expense of producing bicomponent fibers. The method should be simple and be suitable for fabric preparation at high production rates typically used on current state-of-the-art spunbond production equipment.

The inventors have found that the thermal shrinkage of propylene-based fibers and nonwoven fabrics can be increased when the fibers and nonwoven fabrics are made up of a blend of polyolefins and are exposed to elevated temperatures, for example, by exposure to hot air, the fabrics shrink and develop "bulk" and "texture".

References of interest include WO 97/07274; WO 2010/087921, US 2012/0116338 A1; U.S. Pat. Nos. 6,228,951; 6,506,873; 5,244,482; and 5,723,217.

SUMMARY OF THE INVENTION

Disclosed herein are nonwoven fabrics comprising fibers comprising a primary polypropylene and at least one secondary polyolefin, the primary polypropylene having a molecular weight distribution (Mw/Mn, or "MWD") of less than 5.5 and a melt flow rate within a range from 1 to 500 g/10 min (ASTM D1238, 2.16 kg, 230° C.), wherein the fibers have a thermal shrinkage at least 5% higher than the thermal shrinkage of the primary polypropylene alone, as determined in accordance with ASTM D2259.

Disclosed herein also are laminates comprising at least two layers of the above nonwoven fabric of fibers, and/or articles comprising the same.

Also disclosed herein is process for producing a nonwoven fabric comprising forming a polymer composition comprising a primary polypropylene and at least one secondary polyolefin; in a spunbond process, forming fibers then fabric from the polymer composition, and preferably exposing the formed fabrics to a cooling environment ("quenching") to a temperature below 50° C.; then exposing the fabric to an heating environment within a range from 50° C. to 250° C. Preferably the fibers having a thermal shrinkage at least 5% higher than the thermal shrinkage of the primary polypropylene alone, as determined in accordance with ASTM D2259. The spunbond process is preferably conducted at a spinning speed of more than 2500 m/min.

DETAILED DESCRIPTION OF THE INVENTION

Certain polypropylene compositions comprising a primary polypropylene are used to make nonwoven fibers and fabrics ("propylene-based fabrics") that exhibit improved properties, such as thermal shrinkage, compared to the primary polypropylenes alone. These primary polypropylenes are made by using Ziegler-Natta catalysts in certain embodiments. The polypropylene compositions are particularly suited for making fibers and fabrics in a meltspun process such as meltblown, spunbond and/or coform process. The fibers are relatively fine, having an average diameter of less than 20 µm, or a denier (g/9000 m) of less than 2.0, or both. These attributes impart desirable properties to the fabrics made therefrom such as the ability to make lighter (lower basis weight) fabrics that maintain their strength. Further, the polypropylene compositions are such that they can be used to make fine fibers using relatively high throughputs and high attenuation force or pressure.

As used herein, "meltspun" refers to a fabric made by a method of forming a web of fibers ("fabric") in which a polymeric melt or solution is extruded through spinnerets to form filaments which are then attenuated by an appropriate means and laid down on a moving screen, drum or other suitable device. Meltspinning processes include, but are not limited to, spunbonding, flash spinning, coforming, and meltblowing. Meltspun fibers typically have an average diameter of less than 250, or 150, or 60, or 40 or 20, or 10 or 5 µm. Non-limiting examples of suitable polymers used to make meltspun fibers are polypropylene (e.g., homopolymers, copolymers, impact copolymers), polyester (e.g., PET), polyamide, polyurethane (e.g., Lycra™), ethylene-based polymer (e.g., LDPE, LLDPE, HDPE, plastomers), polycarbonate, and blends thereof.

Any "web" of fibers, regardless of how formed, may be used as it is (unbonded) or bonded such as by heating, for example, by passing the web of fibers over a heated calendar or roll.

As used herein, "spunbond" refers to a meltspinning method of forming a fabric in which a polymeric melt or solution is extruded through spinnerets to form filaments which are cooled then attenuated by suitable means such as by electrostatic charge or high velocity air, such attenuated filaments ("fibers") then laid down on a moving screen to form the fabric. Fibers resulting from a spunbond process typically have some degree of molecular orientation imparted therein. As used herein, "meltblown" refers to a method of forming a fabric in which a polymeric melt or solution is extruded through spinnerets to form filaments which are attenuated by suitable means such as by electrostatic charge or high velocity air, such attenuated filaments ("fibers") are then laid down on a moving screen to form the fabric. The fibers themselves may be referred to as being "spunbond" or "meltblown."

As used herein, the term "coform" refers to another meltspinning process in which at least one meltspun die head is arranged near a chute through which other materials are added to the fabric while it is forming. Such other materials may be pulp, superabsorbent particles, cellulose or staple fibers, for example. Coform processes are described in U.S. Pat. Nos. 4,818,464 and 4,100,324. For purposes of this disclosure, the coform process is considered a particular embodiment of meltspun processes. In certain embodiments, the propylene-based fabrics described herein are coform fabrics.

As used herein, a "fiber" is a structure whose length is very much greater than its diameter or breadth; the average diameter is on the order of 0.1 to 250 μm, and comprises natural and/or synthetic materials. Fibers can be "monocomponent" or "bi-component". Bicomponent fibers comprise two or more polymers of different chemical and/or physical properties extruded from separate extruders but the same spinnerets with both polymers within the same filament, resulting in fibers having distinct domains. The configuration of such a bicomponent fiber may be, for example, sheath/core arrangement wherein one polymer is surrounded by another or may be side-by-side as in U.S. Pat. No. 5,108,820, or "islands in the sea" such as in U.S. Pat. No. 7,413,803. Fibers can also be "mono-constituent" or "multi-constituent", meaning that they are made of a single polymer or a blend of two or more polymers to make an unlayered, single-domain fiber. In a particular embodiment the propylene-based fibers described herein are mono-component and mono-constituent.

As used herein, a "laminate" comprises at least two fabrics and/or film layers. Laminates may be formed by any means known in the art. Such a laminate may be made for example by sequentially depositing onto a moving forming belt first a meltspun fabric layer, then depositing another meltspun fabric layer or adding a dry-laid fabric on top of the first meltspun fabric layer, then adding a meltspun fabric layer on top of those layers, followed by some bonding of the laminate, such as by thermal point bonding or the inherent tendency of the layers to adhere to one another, hydroentangling, etc. Alternatively, the fabric layers may be made individually, collected in rolls, and combined in a separate bonding step or steps. Multilayer laminates may also have various numbers of layers in many different configurations and may include other materials like films or coform materials, meltblown and spunbond materials, airlaid materials, etc.

As used herein, a "film" is a flat unsupported section of a plastic and/or elastomeric material whose thickness is very narrow in relation to its width and length and has a continuous or nearly continuous macroscopic morphology throughout its structure allowing for the passage of air at diffusion-limited rates or lower. The laminates described herein may include one or more film layers and can comprise any material as described herein for the fabrics. In certain embodiments, films are absent from the laminates described herein. Films described herein may contain additives that, upon treatment, promote perforations and allow the passage of air and/or fluids through the film. Additives such as clays, antioxidants, etc. as described herein can also be added.

Primary Polypropylene

As used herein, "primary polypropylene" refers to a propylene homopolymer, or a copolymer of propylene, or some mixture of propylene homopolymers and copolymers.

In certain embodiments, the primary polypropylene of the present invention is predominately crystalline, as evidenced by having a melting point generally greater than 110° C., alternatively greater than 115° C., and most preferably greater than 130° C., or within a range from 110, or 115, or 130° C. to 150, or 160, or 170° C. The term "crystalline," as used herein, characterizes those polymers which possess high degrees of inter- and intra-molecular order. The polypropylene preferably has a heat of fusion greater than 60 J/g, alternatively at least 70 J/g, alternatively at least 80 J/g, as determined by DSC analysis. The heat of fusion is dependent on the composition of the polypropylene. A polypropylene homopolymer will have a higher heat of fusion than copolymer or blend of homopolymer and copolymer. Determination of this heat of fusion is influenced by treatment of the sample.

The primary polypropylene can vary widely in structural composition. For example, substantially isotactic polypropylene homopolymer or propylene copolymer containing equal to or less than 9 wt % of other monomers, that is, at least 90 wt propylene, can be used. Further, the primary polypropylene can be present in the form of a graft or block copolymer, in which the blocks of polypropylene have substantially the same stereoregularity as the propylene-α-olefin copolymer so long as the graft or block copolymer has a sharp melting point above 110° C., and alternatively above 115° C., and alternatively above 130° C., characteristic of the stereoregular propylene sequences. The primary polypropylene may be a combination of homopolypropylene, and/or random, and/or block copolymers as described herein. When the above primary polypropylene is a random copolymer, the percentage of the copolymerized α-olefin in the copolymer is, in general, up to 9 wt % by weight of the polypropylene, alternatively 0.5 wt % to 8 wt % by weight of the polypropylene, alternatively 2 wt % S to 6 wt % by weight. The preferred α-olefins ethylene or C4 to C10, or C20 α-olefins. One, or two or more α-olefins can be copolymerized with propylene.

The weight average molecular weight (Mw) of the primary polypropylene can be within a range from 40,000 or 50.000, or 80,000 g/mole to 200,000, or 400,000, or 500,000, or 1,000,000 g/mole. The number average molecular weight (Mn) is within a range from 20,000, or 30,000, or 40,000 g/mole to 50,000, or 55,000, or 60,000, or 70,000 g/mole. The z-average molecular weight (Mz) is at least 300,000, or 350,000 g/mole, or within a range from 300,000, or 350,000 g/mole to 500,000 g/mole. The molecular weight distribution, Mw/Mn, in any embodiment is less than 5.5, or 5, or 4.5, or 4, or within a range from 1.5, or 2, or 2.5, or 3 to 4, or 4.5 or 5 or 5.5.

The melt flow rate (MFR) of the primary polypropylene can be within a range from 1 to 500 g/10 min, alternatively within a range from 1, or 5, or 10, or 15, or 20, or 25 g/10 min to 45, or 55, or 100, or 300, or 350, or 4000, or 450, or 500 g/10 min, as measured per ASTM 1238, 2.16 kg at 230° C.

In any embodiment the primary polypropylene may form thermoplastic blends including from 1 wt % to 95 wt % by weight of the blend of the polypropylene polymer component. For example, the primary polypropylene of the present invention may include from 2, or 5, or 10 wt % to 20, or 25, or 30, or 35, or 40, or 50 wt %, by weight blend, of a secondary polyolefin, described further below. Most preferably, other polyolefins such as polyethylenes and other polypropylenes ("propylene-based polymers", especially a "propylene-based elastomer") may be blended with the primary polypropylene component.

There is no particular limitation on the method for preparing the primary polypropylene of the invention. For example, the polymer may be a propylene homopolymer obtained by homopolymerization of propylene in a single stage or multiple stage reactor. Copolymers may be obtained by copolymerizing propylene and an ethylene and/or a C4 to C10, or C20 α-olefin in a single stage or multiple stage reactor. Polymerization methods include high pressure, slurry, gas, bulk, or solution phase, or a combination thereof, using a traditional Ziegler-Natta catalyst or a single-site, metallocene catalyst system, or combinations thereof including bimetallic supported catalyst systems. Polymerization may be carried out by a continuous or batch process and may include use of chain transfer agents, scavengers, or other such additives as deemed applicable. Most preferably however a Ziegler-Natta catalyst is used to form the primary polypropylene.

The primary polypropylene may be reactor grade, meaning that it has not undergone any post-reactor modification by reaction with peroxides, cross-linking agents, e-beam, gamma-radiation, or other types of controlled rheology modification. In any embodiment, the primary polypropylene may have been visbroken by peroxides as is known in the art. In any case, the polyolefins used in the examples set forth here, and described above, have the stated properties as used, visbroken or not.

Exemplary commercial products of the polypropylene polymers in primary polypropylene includes polypropylene homopolymer, random copolymer and impact copolymer produced by using Ziegler-Natta catalyst system have a broad Mw/Mn. An example of such product is ExxonMobil PP3155, a 36 g/10 min MFR homopolymer available from ExxonMobil Chemical Company, Baytown, Tex.

Polymer Compositions

The fibers and fabrics may comprise (or consist essentially of, or consist of) a polymer composition comprising the primary polypropylene and a secondary polyolefin, most preferably an ethylene-based polymer or propylene-based polymer component. The second are polyolefin component may be added to the primary polypropylene by methods well known in the art, such as by melt blending, etc. The secondary polyolefin in any embodiment is present in the composition within a range from 2, or 5, or 10 wt %/o to 20, or 25, or 30, or 35, or 40, or 50 wt %, by weight composition, of a secondary polyolefin.

The ethylene-based polymer component can be low density polyethylene (density 0.90 to less than 0.935 g/cm$^3$), linear low density polyethylene, ultra-low density polyethylene (density 0.85 to less than 0.90 g/cm$^3$), medium density polyethylene (density 0.935 to less than 0.945 g/cm$^3$), high density polyethylene (density 0.945 to 0.98 g/cm$^3$), or combinations thereof.

The ethylene-based polymer is not limited by any particular method of preparation and may be formed using any process known in the art. For example, the ethylene-based to polymer may be formed using gas phase, solution, or slurry processes.

In preferred embodiments, the ethylene-based polymer has a density of from 0.900 to 0.945 g/cm$^3$, a melt index (MI), $I_{2.16}$, of from 0.1 to 15 g/10 min, a MWD of from 1.5 to 5.5, and a melt index ratio (MIR). $I_{21.6}/I_{2.16}$, of from 10 to 100. In various embodiments, the above ethylene-based polymer may have one or more of the following properties:
- a density (sample prepared according to ASTM D-4703, and the measurement according to ASTM D-1505) of a 0.900 to 0.940 g/cm$^3$, or 0.912 to 0.935 g/cm$^3$;
- an MI ($I_{2.16}$, ASTM D-1238, 2.16 kg, 190° C.) of 0.1 to 15 g/10 min, or 0.3 to 10 g/10 min, or 0.5 to 5 g/10 min;
- an MIR ($I_{21.6}$ (190° C., 21.6 kg)/$I_{2.16}$ (190° C., 2.16 kg)) of 10 to 100, or 15 to 80, or 16 to 50;
- an MWD of 1.5 to 5.5; and/or
- a branching index of 0.9 to 1.0, or 0.96 to 1.0, or 0.97 to 1.0. Branching Index is an indication of the amount of branching of the polymer and is defined as $g'=[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

In any embodiment, ethylene-based polymer produced using a metallocene catalyst system (mPEs); for example, ethylene homopolymers or copolymers may be employed. In a particular example, mPE homopolymers and copolymer are those ethylene-based polymer derived from pure ethylene, or mixture of ethylene and one or more C3 to C10, or C20 α-olefin comonomers, the ethylene-based polymer has a density within a range from 0.900 to 0.945 g/cm$^3$, a melt index (MI), $I_{2.16}$, within a range from 0.1 to 15 g/10 min, a MWD within a range from 1.5 to 5.5, and a melt index ratio (MIR), $I_{21.6}/I_{2.16}$, within a range from 10 to 100. Illustrative but not exclusive commercially products are available from ExxonMobil Chemical Company, Baytown, Tex., under the trade name Enable™ among others well known in the industry.

The propylene-based polymer component can be a high melt strength polypropylene or a propylene-based elastomer. The propylene-based elastomer as described herein is a copolymer of propylene-derived units and units derived from at least one of ethylene or a C4 to C10 α-olefin. The propylene-based elastomer may contain at least 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of 95 wt %, 94 wt %, 92 wt %, 90 wt %, or 85 wt %, to a lower limit of 60 wt %, 65 wt %, 70 wt %, 75 wt %, 80 wt %, 84 wt %, or 85 wt % of the propylene-based elastomer. The comonomer-derived units include at least one of ethylene or a C4 to C10 α-olefin may be present in an amount of 1 to 35 wt %, or 5 to 35 wt %, or 7 to 32 wt %, or 8 to 25 wt %, or 8 to 20 wt %, or 8 to 18 wt %, of the propylene-based elastomer. The comonomer content may be adjusted so that the propylene-based elastomer has a heat of fusion of less than 80 J/g, a melting point of 105° C. or less, and a crystallinity of 2% to 65% of the crystallinity of isotactic polypropylene, and a melt flow rate (MFR) within a range from 2 to 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise 5 to 25 wt %, or 8 to 20 wt %, or 9 to 16 wt %, ethylene-derived units. In some embodiments, the propylene-based elastomer consists essentially of units derived from propylene and ethylene, that is, the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a C4 to C10 α-olefin is present, the amount of one comonomer may be less than 5 wt % of the propylene-based elastomer, but the combined amount of comonomers of the propylene-based elastomer is 5 wt % or greater.

The propylene-based elastomer may have a triad tacticity of three propylene units, as measured by $^{13}$C NMR, of at least 75%, at least 80%, at least 82%, at least 85%, or at least 90%. Preferably, the propylene-based elastomer has a triad tacticity of 50 to 99%, or 60 to 99%, or 75 to 99%, or 80 to 99%. In some embodiments, the propylene-based elastomer may have a triad tacticity of 60 to 97%.

The propylene-based elastomer has a heat of fusion ("$H_f$"), as determined by DSC, of 80 J/g or less, or 70 J/g or less, or 50 J/g or less, or 40 J/g or less. The propylene-based elastomer may have a lower limit $H_f$ of 0.5 J/g, or 1 J/g, or 5 J/g. For example, the $H_f$ value may range from 1.0, 1.5, 3.0, 4.0, 6.0, or 7.0 J/g, to 30, 35, 40, 50, 60, 70, 75, or 80 J/g.

The propylene-based elastomer may have a percent crystallinity, as determined according to the DSC procedure described herein, of 2 to 65%, or 0.5 to 40%, or 1 to 30%, or 5 to 35%, of the crystallinity of isotactic polypropylene. The thermal energy for the highest order of propylene (i.e., 100% crystallinity) is estimated at 189 J/g. In some embodiments, the copolymer has crystallinity less than 40%, or within a range from 0.25 to 25%, or within a range from 0.5 to 22% of the crystallinity of isotactic polypropylene.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, for example, ethylidene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexane, vinyl cyclooctene, 4-vinyl cyclohexene, allyl cyclodecene, vinyl cyclododecene, and tetracyclo-(A-11,12)-5,8-dodecene. The amount of diene-derived units present in the propylene-based elastomer may range from an upper limit of 15%, 10%, 7%, 5%, 4.5%, 3%, 2.5%, or 1.5%, to a lower limit of 0%, 0.1%, 0.2%, 0.3%, 0.5%, 1%, 3%, or 5%, based on the weight of the propylene-based elastomer.

The propylene-based elastomer may have a single peak melting transition as determined by DSC. In some embodiments, the copolymer has a primary peak transition of 90° C. or less, with a broad end-of-melt transition of 110° C. or greater. The peak "melting point" ("$T_m$") is defined as the temperature of the greatest heat absorption in melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of 110° C. or less, 105° C. or less, 100° C. or less, 90° C. or less, 80° C. or less, or 70° C. or less. In some embodiments, the propylene-based elastomer has a $T_m$ of 25 to 105° C., or 60 to 105° C., or 70 to 105° C., or 90 to 105° C.

The propylene-based elastomer may have a density of 0.850 to 0.900 g/cm$^3$, or 0.860 to 0.880 g/cm$^3$, at 22° C. as measured per ASTM D1505.

The propylene-based elastomer may have a melt flow rate ("MFR"), as measured per ASTM D1238, 2.16 kg at 230° C., of at least 2 g/10 min. In some embodiments, the propylene-based elastomer may have an MFR of 2 to 20 g/10 min, or 2 to 10 g/10 min, or 2 to 5 g/10 min.

The propylene-based elastomer may have an Elongation at Break of less than 2000%, less than 1800%, less than 1500%, less than 10000%, or less than 800%, as measured per ASTM D412.

The propylene-based elastomer may have a weight average molecular weight ($M_w$) of 5,000 to 5,000,000 g/mole, or 10,000 to 1,000,000 g/mole, or 50,000 to 400,000 g/mole. The propylene-based elastomer may have a number average molecular weight ($M_n$) of 2,500 to 250,000 g/mole, or 10,000 to 250,000 g/mole, or 25,000 to 250,000 g/mole. The propylene-based elastomer may have a z-average molecular weight ($M_z$) of 10,000 to 7,000,000 g/mole, or 80,000 to 700,000 g/mole, or 100,000 to 500,000 g/mole. Finally, the propylene-based elastomer may have a molecular weight distribution MWD of 1.5 to 20, or 1.5 to 15, or 1.5 to 5, or 1.8 to 3, or 1.8 to 2.5.

The polymer compositions disclosed herein may include one or more different propylene-based elastomers, such as distinct propylene-based elastomers each having one or more different properties such as, for example, different comonomer or comonomer content. Such combinations of various propylene-based elastomers are all within the scope of the invention.

The propylene-based elastomer may comprise copolymers prepared according to the procedures described in WO 02/36651. U.S. Pat. No. 6,992,158, and/or WO 00/01745.

Preferred methods for producing the propylene-based elastomer may be found in U.S. Pat. Nos. 7,232,871 and 6,881,800. The invention is not limited by any particular polymerization method for preparing the propylene-based elastomer, and the polymerization processes are not limited by any particular type of reaction vessel.

Suitable propylene-based elastomers may be available commercially under the trade names Vistamaxx™ (Exxon-Mobil Chemical Company, Houston, Tex., USA), Versify™ (The Dow Chemical Company, Midland, Mich., USA), certain grades of Tafmer™ XM or Notio™ (Mitsui Company, Japan), and certain grades of Softel™ (Basell Polyolefins of the Netherlands). The particular grade(s) of commercially available propylene-based elastomer suitable for use in the invention can be readily determined using methods commonly known in the art.

Additives

A variety of additives may be incorporated into the primary polypropylene and/or polymer compositions described above used to make the fibers and fabric. Such additives include, for example, stabilizers, antioxidants, fillers, colorants, nucleating agents and slip additives. Primary and secondary antioxidants include, for example, hindered phenols, hindered amines, and phosphates. Nucleating agents include, for example, sodium benzoate and talc. Also, other nucleating agents may also be employed such as Ziegler-Natta olefin product or other highly crystalline polymer. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Other additives include, for example, fire/flame retardants, plasticizers, vulcanizing or curative agents, vulcanizing or curative accelerators, cure retarders, processing aids, tackifying resins, and the like. The aforementioned additives of may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents, lubricants, and nucleating agents. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired.

In any embodiment, the polymer compositions described herein consist of the primary polypropylene, the secondary polyolefin, and within a range from 0.1 to 3, or 4, or 5 wt % of additives by weight of the polymer composition. Most preferably, those additives consist of primary and secondary antioxidants, acid scavenger, nucleating agent, and pigment or other colorant.

Blending of Polymer Compositions

The blends may be prepared by any procedure that produces a mixture of the components, for example, dry blending, melt blending, etc. In certain embodiments, a complete mixture of the polymeric components is indicated by the uniformity of the morphology of the dispersion of the polymer components. In a preferred embodiment, the primary polypropylene is present in the polymer compositions in an amount in the range 98, or 95, or 90 wt % to 80, or 75, or 70, or 65, or 60, or 50 wt % by weight of the blend. The other component of the blend may be one or more of a polyethylene, polyurethane, another propylene-based polymer as described herein having properties distinct from the primary polypropylene, or an elastomer such as a propylene-based elastomer or a styrenic block copolymer.

Melt Blend:

Continuous melt mixing equipment are generally used. These processes are well known in the art and include single and twin screw compounding extruders as well as other machines and processes, designed to homogenize the polymer components intimately.

Dry Blend:

The primary polypropylene and other components may be dry blended and fed directly into the fiber or nonwoven process extruders. Dry blending is accomplished by combining primary polypropylene and other components in a dry blending equipment. Such equipment and processes are well known in the art and include a drum tumbler, a double cone blender, etc. In this case, primary polypropylene and other components are melted and homogenized in the process extruder similar to the melt blend process. Instead of making the pellets, the homogenized molten polymer is delivered to the die or spinneret to form the fiber and fabric.

Process for Producing Nonwoven Fabric of Fibers

The invention further discloses a process for producing a nonwoven fabric of fibers comprising: (a) forming a polymer composition comprising one or more primary polypropylene having a MWD of less than 5.5, preferably within a range from 1.5, or 2, or 2.5, or 3 to 4, or 4.5 or 5 or 5.5, and a melt flow rate within a range from 1 to 500 g/10 min, alternatively 5, or 10, or 15, or 20, or 25 g/10 min to 300, or 350, or 400, or 450, or 500 g/10 min, as measured per ASTM 1238, 2.16 kg at 230° C.; (b) in a spunbond process, forming fibers then fabric from the polymer composition; and (c) exposing the fabric to a temperature heating environment of at least 50° C.; wherein the fibers having a thermal shrinkage at least 5%, preferably 10, or 20, or 30, or 40, or 50%, higher than the thermal shrinkage of the primary polypropylene alone, as determined in accordance with ASTM D2259; alternatively, the fibers having a thermal shrinkage of at least 5, alternatively 10, or 15, or 20, or 25, or 30, or 35, or 40, or 50, as determined in accordance with ASTM D2259.

Particularly disclosed herein are nonwoven fabrics produced using primary polypropylenes ("propylene-based fabrics") or polymer compositions including such primary polypropylenes. The nonwoven fabrics are meltspun fabrics in certain embodiments, and are spunbond in a particular embodiment. The spunbonding process in certain embodiments involves the process of melt-extruding the desired material through one or more spinnerets comprising at least one die having small diameter holes, the stream of molten material then being attenuated (drawn) by pressurized air, creating a venturi effect. The material may be added to the melt-extruder as pellets having desirable additives, or additives may be combined in this step.

In particular, the formation of primary polypropylene filaments is accomplished by extruding the molten material through an appropriate die comprising a plurality of spinnerets (capillaries, holes) as known in the art, followed by quenching the molten material (having a desirable melt temperature within the die) with a quench air system the temperature of which may be controlled. Common quench air systems include those that deliver temperature controlled air in a cross-flow direction. Filaments are then pulled away from the one or more spinnerets and thus attenuated. To accomplish this, the filaments are attenuated by passing through a venturi device in which due to pressurized air flow, accelerates and/or attenuates the filaments. Increasing the increasing the air velocity within the venturi device may be done by a variety of methods described in the art, including raising the air pressure within the venturi device. Typically, increasing this air velocity (for example by increasing air pressure) results in increased filament velocity and greater filament attenuation. The higher the air pressure, the more the primary polypropylene is accelerated and so attenuated, in terms of speed and denier of the fiber that is formed therefrom. To achieve finer fibers, high air pressures are desirable. However, this is balanced by the tendency for the filaments to break due to excessive pressure. The primary polypropylenes described herein can be attenuated using higher air pressures than is typical in other spunbond processes. In any embodiment, the attenuating air pressure used in the spunbonding process is greater than 2000 or 3000 or 4000 or 6000 Pa. and less than 600 or 500 or 400 kPa in other embodiments; and is within a range from 2000 or 3000 or 4000 to 8000 or 10,000 or 15,000 Pa in other embodiments. Such air pressure may be generated in a closed area where the fibers are attenuated such as a "cabin", and the air pressure therein is sometimes referred to as a "cabin pressure."

Air attenuation can be accomplished by any means such as described and the process is not limited to any particular method of attenuating the filaments. In any embodiment, the venturi effect to attenuate the fibers is obtained by drawing the filaments of primary polypropylene using an aspirator slot (slot draw), which runs the width of the machine. In another embodiment, the venturi effect is obtained by drawing the filaments through a nozzle or aspirator gun. Multiple guns can be used, since orifice size can be varied to achieve the desired effect. Filaments of the primary polypropylene thus formed are collected onto a screen ("wire") In any embodiment, or porous forming belt in another embodiment to form a fabric of the filaments. Typically, a vacuum is maintained on the underside of the belt to promote the formation of a uniform fabric and to remove the air used to attenuate the filaments and creating the air pressure. The actual method of air attenuation is not critical, as long as the desirable accelerating air velocity, (often reflected by the air pressure), and hence venturi effect, is obtained to attenuate the primary polypropylene filaments.

Pressure in the die block In any embodiment is generated by a gear pump. The method of forming the pressure in the die block is not critical, but the pressure inside the die block ranges from 35 to 50 bar (3500 to 5000 kPa) In any embodiment, and from 36 to 48 bar (3600 to 4800 kPa) in another embodiment, and from 37 to 46 bar (3700 to 4600 kPa) in yet another embodiment.

The melt temperature in the die of the primary polypropylene melt ranges from 200 to 260° C. In any embodiment, and from 200 to 250° C. in yet another embodiment, and ranges from 210 to 245° C. in yet another embodiment.

Any number of spinnerets including any number of dies can be used. In any embodiment, a die is used that contains from 4000 to 9000 holes per meter, and from 4500 to 8500 holes per meter in another embodiment, and from 5000 to 8000 holes per meter in yet another embodiment, wherein any upper die hole limit may be combined with any lower die hole to obtain a desirable range of die holes.

In certain embodiments, the spunbond line throughput is within a range from 150 or 170 to 200 or 270 or 300 kg/hr. In certain other embodiments, the spunbond line throughput per hole is within a range from 0.20 or 0.30 or 0.40 to 0.60 or 0.70 or 0.90 grams/hole/minute.

In certain embodiments, the spunbond process is conducted at a spinning speed within a range from 700 or 900 or 1100 or 1300 or 1500 m/min to 2000, or 2500, or 3000, or 3500, or 4000, or 4500, or 5000 m/min.

In forming propylene-based fabrics, there are any number of ways of dispersing or distributing the filaments to form a uniform fabric. In any embodiment, a deflector is used, either stationary or moving. In another embodiment, static electricity or air turbulence is used to improve fabric uniformity. Other means may also be used as is known in the art. In any case, the formed fabric typically passes through compression rolls to improve fabric integrity. The fabric, In any embodiment, is then passed between heated calender rolls where the raised lands on one roll bond the fabric at certain points to further increase the spunbonded fabric integrity. The compression and heated calender can be isolated from the area where the filaments are formed In any embodiment.

Preferably, the thus formed fabrics (bonded or unbonded) are exposed to a cooling environment to a temperature below 50, or 45, or 40, or 45, or 40° C., or within a range from 20 to 50° C. Cooling can be effectuated by any means such as cooling air, or chill rollers. Following the cooling, the fabrics are heated, preferably on a calendar roll, heated air or heated oven environment or the like, to a temperature of at least 50, or 55, or 60, or 65, or 70, or 75, or 80, or 85, or 90° C., or within a range from 50, or 55 to 80, or 90, or 100, or 120° C. More particularly, heat may be applied by any suitable method known in the art, such as heated air, infrared heaters, heated nipped rolls, or partial wrapping of the fabric or laminate around one or more heated rolls or steam canisters, etc. Heat may also be applied to the grooved rolls themselves. It should also be understood that other grooved roll arrangement are equally suitable, such as two grooved rolls positioned immediately adjacent to one another.

Thus, in any embodiment is a process for producing a nonwoven fabric comprising (a) forming a polymer composition comprising one or more primary polypropylene having a MWD of less than 5.5 and a melt flow rate within a range from 1 to 500 g/10 min; (b) in a spunbond process, forming fibers then fabric from the polymer composition; and optionally cooling the fabric to a temperature less than 50, or 40, or 30° C.; followed by exposing the fabric to a temperature environment within a range from 50, or 60, or 80, or 100° C. to 200, or 220, or 250° C.; wherein the fibers having a thermal shrinkage at least 5% higher than the thermal shrinkage of the primary polypropylene alone, as determined in accordance with ASTM D2259.

Various additional potential processing and/or finishing steps known in the art, such as slitting, treating, printing graphics, etc., may be performed without departing from the spirit and scope of the invention. For instance, the fabric or laminate comprising the fabric may optionally be mechanically stretched in the cross-machine and/or machine directions to enhance extensibility. In any embodiment, the fabric or laminate may be coursed through two or more rolls that have grooves in the CD and/or MD directions. Such grooved satellite/anvil roll arrangements are described in US 2004/0110442 and US 2006/0151914 and U.S. Pat. No. 5,914,084. For instance, the fabric or laminate may be coursed through two or more rolls that have grooves in the CD and/or MD directions. The grooved rolls may be constructed of steel or other hard material (such as a hard rubber). Besides grooved rolls, other techniques may also be used to mechanically stretch the composite in one or more directions. For example, the composite may be passed through a tenter frame that stretches the composite. Such tenter frames are well known in the art and described, for instance, in US 2004/0121687.

No matter how formed and calendered, the propylene-based fabrics comprise fibers having an average diameter of less than 20 or 17 or 15 or 12 µm in certain embodiments, alternatively from 0.5, or 1, or 2, or 3, or 4 to 12, or 15, or 17, or 20 µm, and/or a denier (g/9000 m) of less than 2.0 or 1.9 or 1.8 or 1.6 or 1.4 or 1.2 or 1.0 in certain embodiments, alternatively from 0.2, or 0.4 or 0.6 to 1.0, or 1.2 or 1.4 or 1.6 or 1.8, or 2.0. Such fabrics, when calendered at a temperature (calender set temperature) within a range from 110 to 150° C. have a MD Tensile Strength (WSP 110.4 (05)) of greater than 20 or 25 N/5 cm in certain embodiments. The fabrics have a CD Tensile Strength (WSP 110.4 (05)) of greater than 10 or 15 N/5 cm when calendered at a temperature (calender set temperature) within a range from 110 to 150° C. in other embodiments.

In certain embodiments, the fibers used to form the propylene-based fabrics are bicomponent or "conjugate" fibers. These include structures that are side-by-side, segmented, sheath/core, island-in-the-sea structures ("matrix fibril"), and others as is known in the art. In these structures, at least one of the polymers used to make the fiber is the primary polypropylene. The second, third, etc. component of the conjugate fiber may be made from any suitable materials such as polypropylene, polyethylene (e.g., LDPE, LLDPE, HDPE), plastomers (ethylene-α-olefin copolymers), polyurethane, polyesters such as polyethylene terephthanlate, polylactic acid, polyvinyl chloride, polytetrafluoroethylene, styrenic block copolymers, propylene-α-olefin elastomers (e.g., Vistmaxx™) ethylene vinyl acetate copolymers, polyamide, polycarbonate, cellulosics (e.g., cotton, Rayon™, Lyocell™, Tencil™), wood, viscose, and blends of any two or more of these materials. A particularly preferred second (or third, etc.) component is an ethylene-based polymer.

The main objective of producing bicomponent fibers is to exploit capabilities not existing in either polymer alone. By this technique, it is possible to produce fibers of any cross sectional shape or geometry that can be imagined. Side-by-side fibers are generally used as self-crimping fibers. There are several systems used to obtain a self-crimping fiber. One of them is based on different shrinkage characteristics of each component. There have been attempts to produce self-crimping fibers based on different electrometric properties of the components. Some types of side-by-side fibers crimp spontaneously as the drawing tension is removed and others have "latent crimp", appearing when certain ambient conditions are obtained. In some embodiments "reversible" and "non-reversible" crimps are used, when reversible crimp can be eliminated as the fiber is immersed in water and reappears when the fiber is dried. This phenomenon is based on swelling characteristics of the components. Different melting points on the sides of the fiber are taken advantage of when fibers are used as bonding fibers in thermally bonded non-woven webs. Sheath-core bicomponent fibers are those fibers where one of the components (core) is fully surrounded by the second component (sheath). Adhesion is not always essential for fiber integrity.

The most common method of producing sheath-core fibers is a technique where two polymer liquids are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning. Eccentric fiber production is based on several approaches: eccentric positioning of the inner polymer channel and controlling of the supply rates of the two component polymers: introducing a varying element near the supply of the sheath component melt; introducing a stream of single component merging with concentric sheath-core component just before emerging from the orifice; and deformation of spun concentric fiber by passing it over a hot edge. Matrix fibril fibers are spun from the mixture of two polymers in the required proportion; where one polymer is suspended in droplet form in the second melt. A feature in production of matrix-fibril fibers is the necessity for artificial cooling of the fiber immediately below the spinneret orifices. Different spinnability of the two components would almost disable the spinnability of the mixture, except for low concentration mixtures (less than 20%). Bicomponent fibers are used to make fabrics that go into such products as diapers, feminine care and adult incontinence products (as top sheet, back sheet, leg cuffs, elastic waistband, transfer layers); air-laid nonwoven structures are used as absorbent cores in wet wipes; and used in spun laced nonwoven products like medical disposable textiles, filtration products.

However, in any embodiment, bicomponent, sheath/core fibers and fabrics (bi-component) are absent from any laminates described herein, and the fibers and fabrics themselves are simple mono-component fibers and fabrics, made using either a single-polymer, such as the primary polypropylene, or multiple polymer composition that is intimately blended.

In certain embodiments, the one or more propylene-based fabrics may form a laminate either with itself or with other secondary layers. The lamination of the various layers can be done such that CD and/or MD orientation is imparted into the fabric or laminate, especially in the case where the laminate includes at least one elastomeric layer. Many approaches may be taken to form a laminate comprising an elastomeric film and/or fabric layer which remains elastomeric once the laminate layers are bonded together. One approach is to fold, corrugate, crepe, or otherwise gather the fabric layer prior to bonding it to the elastomeric film. The gathered fabric is bonded to the film at specified points or lines, not continually across the surface of the film. While the film/fabric is in a relaxed state, the fabric remains corrugated or puckered on the film; once the elastomeric film is stretched, the fabric layer flattens out until the puckered material is essentially flat, at which point the elastomer stretching ceases.

Another approach is to stretch the elastomeric film/fabric, then bond the fabric to the film while the film is stretched. Again, the fabric is bonded to the film at specified points or lines rather than continually across the surface of the film. When the stretched film is allowed to relax, the fabric corrugates or puckers over the unstretched elastomeric film.

Another approach is to "neck" the fabric prior to bonding it to the elastomer layer as described in U.S. Pat. Nos. 5,336,545, 5,226,992, 4,981,747 and/or 4,965,122. Necking is a process by which the fabric is pulled in one direction, which causes the fibers in the fabric to slide closer together, and the width of the fabric in the direction perpendicular to the pulling direction is reduced. If the necked fabric is point-bonded to an elastomeric layer, the resulting laminate will stretch somewhat in a direction perpendicular to the direction in which the fabric was pulled during the necking process, because the fibers of the necked fabric can slide away from one another as the laminate stretches.

Laminates

This invention further provides a laminate comprising one or more layers of a nonwoven fabric comprising a polymer composition comprising at least one primary polypropylene as described herein, wherein the fibers having a thermal shrinkage at least 5%, preferably 10, or 20, or 30, or 40, or 50%, higher than the thermal shrinkage of the primary polypropylene alone, as determined in accordance with ASTM D2259; alternatively, the fibers having a thermal shrinkage of at least 5, alternatively 10, or 15, or 20, or 25, or 30, or 35, or 40, or 50, as determined in accordance with ASTM D2259.

Preferably, the laminates are allowed to cool, if previously heated, to a temperature below 50, or 45, or 40, or 45, or 40° C., or within a range from 20 to 50° C. Cooling can be effectuated by any means such as cooling air, or chill rollers. Following the cooling, the fabrics are activated such as by heating the laminates in a similar fashion to activation of the individual fabrics described above. In particular the laminates may be heated, preferably on a calendar roll, heated air or heated oven environment or the like, to a temperature of at least 50, or 55, or 60, or 65, or 70, or 75, or 80, or 85, or 90° C., or within a range from 50, or 55 to 80, or 90, or 100, or 120° C. More particularly, heat may be applied by any suitable method known in the art, such as heated air, infrared heaters, heated nipped rolls, or partial wrapping of the fabric or laminate around one or more heated rolls or steam canisters, etc. Heat may also be applied to the grooved rolls themselves. It should also be understood that other grooved roll arrangement are equally suitable, such as two grooved rolls positioned immediately adjacent to one another.

Yet another approach is to activate the laminate by a physical treatment, modification or deformation of the laminate, said activation being performed by mechanical means. For example, the laminate may be incrementally stretched by using intermeshing rollers, as discussed in U.S. Pat. No. 5,422,172, or US 2007/0197117 to render the laminate stretchable and recoverable. Finally, the film or fabric may be such that it needs no activation and is simply formed onto and/or bound to a secondary layer to form a laminate.

In some embodiments, the laminates comprising one or more secondary layers comprising other fabrics, nets, coform fabrics, scrims, and/or films prepared from natural and/or synthetic materials. The materials may be extensible, elastic or plastic in certain embodiments. In particular embodiments, the one or more secondary layers comprise materials selected from the group consisting of polypropylene, polyethylene, plastomers, polyurethane, polyesters such as polyethylene terephthanlate, polylactic acid, polyvinyl chloride, polytetrafluoroethylene, styrenic block copolymers, ethylene vinyl acetate copolymers, polyamide, polycarbonate, cellulosics (e.g., cotton, Rayon™, Lyocell™, Tencil™), wood, viscose, and blends of any two or more of these materials. Any secondary layer may also comprise (or consist essentially of) any material that is elastic, examples of which include propylene-α-olefin elastomer, natural rubber (NR), synthetic polyisoprene (IR), butyl rubber (copolymer of isobutylene and isoprene, IIR), halogenated butyl rubbers (chloro-butyl rubber: CIIR; bromo-butyl rubber: BIIR), polybutadiene (BR), styrene-butadiene rubber (SBR), nitrile rubber, hydrogenated nitrile rubbers, chloroprene rubber (CR), polychloroprene, neoprene, EPM (ethylene-propylene rubber) and EPDM rubbers (ethylene-propylene-diene rubber), epichlorohydrin rubber (ECO), polyacrylic rubber (ACM, ABR), silicone rubber, fluorosilicone rubber, fluoroelastomers, perfluoroelastomers, polyether block amides (PEBA), chlorosulfonated polyethylene (CSM), ethylene-vinyl acetate (EVA), thermoplastic elastomers (TPE), thermoplastic vulcanizates (TPV), thermoplastic polyurethane (TPU), thermoplastic olefins (TPO), polysulfide rubber, or blends of any two or more of these elastomers. In certain embodiments, the one or more elastic layers comprise propylene-α-olefin elastomer, styrene-butadiene rubber, or blends thereof. In yet other embodiments, the one or more elastic layers consist essentially of propylene-α-olefin elastomer(s). In a particular embodiment, styrenic-based elastomers (polymers comprising at least 10 wt % styrene or substituted-styrene-derived units) are absent from the multilayer fabric.

The secondary layer(s) may be in the form of films, fabrics, or both. Films may be cast, blown, or made by any other suitable means. When the secondary layers are fabrics, the secondary layers can be meltspun, dry-laid or wet-laid fabrics. The dry-laid processes include mechanical means, such as how carded fabrics are produced, and aerodynamic means, such as, air-laid methods. Dry-laid nonwovens are made with staple fiber processing machinery such as cards and garnetts, which are designed to manipulate staple fibers in the dry state. Also included in this category are nonwovens made from fibers in the form of tow, and fabrics composed of staple fibers and stitching filaments or yarns, namely, stitchbonded nonwovens. Fabrics made by wet-laid processes made with machinery associated with pulp fiberizing, such as hammer mills, and paperforming. Web-bonding processes can be described as being chemical processes or physical processes. In any case, dry- and wet-laid fabrics can be jet and/or hydroentangled to form a spunlace fabric as is known in the art. Chemical bonding refers to the use of water-based and solvent-based polymers to bind together the fibrous webs. These binders can be applied by saturation (impregnation), spraying, printing, or application as a foam. Physical bonding processes include thermal processes such as calendering and hot air bonding, and mechanical processes such as needling and hydroentangling. Spunlaid nonwovens are made in one continuous process: fibers are spun by melt extrusion and then directly dispersed into a web by deflectors or can be directed with air streams.

In certain embodiments, the propylene-based polymer may be formed into coform fabrics. Methods for forming such fabrics are described in, for example, U.S. Pat. Nos. 4,818,464 and 5,720,832. Generally, fabrics of two or more different thermoplastic and/or elastomeric materials may be formed.

The nonwoven fabric of fibers can be used to making articles, such as personal care products, baby diapers, training pants, absorbent underpads, swim wear, wipes, feminine hygiene products, bandages, wound care products, medical garments, surgical gowns, filters, adult incontinence products, surgical drapes, coverings, garments, cleaning articles and apparatus.

EXAMPLES

The following non-limiting examples demonstrate the features of the inventive process and composition. Those features are elucidated by testing which is described here.

Melt Flow Rate

Melt Flor Rate ("MFR") is defined in grams of polymer per 10 min (g/10 min or its equivalent unit dg/min) and was measured according to ASTM D1238 (2.16 kg, 230° C.). For reactor granule and/or powder polypropylene ("PP") samples that are not stabilized, the following sample preparation procedure is followed before measuring the MFR. A solution of butylated hydroxy toluene (BHT) in hexane is prepared by dissolving 40±1 grams of BHT into 4000±10 ml of hexane. Weigh 10±1 grams of the granule/powder PP sample into an aluminum weighing pan. Add 10±1 ml of the BHT/hexane solution into the aluminum pan under a hood. Stir the sample, if necessary, to thoroughly wet all the granules. Place the sample slurry in a vacuum oven at 105°±5° C. for a minimum of 20 min. Remove the sample from the oven and place in a nitrogen purged desiccator a minimum of 15 minutes allowing the sample to cool. Measure the MFR following ASTM D1238 procedure.

Molecular Weight Characteristics

The molecular weight properties (Mz, Mw, Mn, Mw/Mn, etc.) were determined with a high temperature Gel Permeation Chromatography (PolymerChar GPC-IR) equipped with a multiple-channel band filter based Infrared detector ensemble IR5, in which a broad-band channel is used to measure the polymer concentration while two narrow-band channels were used for characterizing composition. Three Agilent PLgel 10 μm mixed-B LS columns were used to provide polymer separation. Aldrich reagent grade 1,2,4-trichlorobenzene (TCB) with 300 ppm BHT was used as the mobile phase. The TCB mixture was filtered through a 0.1 μm Teflon filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. A given amount of polymer sample was weighed and sealed in a standard vial with 10 μL flow marker (heptane) added to it. After loading the vial in the autosampler, polymer was automatically dissolved in the instrument with 8 mL added TCB solvent. The polymer was dissolved at 160° C. with continuous shaking for 1 hour for most polyethylene ("PE") samples or 2 hours for PP samples. The TCB densities used in concentration calculation were 1.463 g/ml at 22° C. and 1.284 g/ml at 145° C. The sample solution concentration was from 0.2 to 2.0 mg/ml, with lower concentrations being used for higher molecular weight samples. The MWD values can be determined to ±0.05.

The concentration, c, at each point in the chromatogram was calculated from the baseline-subtracted IR5 broadband signal, I, using the following equation:

$$c = \alpha I$$

where "α" is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight was determined by combining the universal calibration relationship with the column calibration, which was performed with a series of monodispersed polystyrene (PS) standards. The MW was calculated at each elution volume with the following $$\log M_X = \frac{\log(K_X/K_{PS})}{\alpha_X + 1} + \frac{\alpha_{PS} + 1}{\alpha_X + 1} \log M_{PS}$$

where the variables with subscript "X" stand for the test sample while those with subscript "PS" stand for "polystyrene" sample. In this method, $a_X = 0.67$ and $K_{PS} = 0.000175$ while $a_X$ and $K_X$ were obtained from published literature. Specifically, a/K=0.695/0.000579 for polyethylene homopolymer and 0.705/0.0002288 for polypropylene homopolymer.

The universal calibration method was used for determining the molecular weight distribution (MWD, Mw/Mn) and molecular-weight averages (Mn, Mw, Mz, etc.) of eluting polymer fractions. Thirteen narrow molecular-weight distribution polystyrene standards (obtained from Polymer Labs, UK) within a range of 1.5 to 8200 kg/mol were used to generate a universal calibration curve. Mark-Houwink parameters were obtained from Appendix I of Mori, S.; Barth, H. G. Size Exclusion Chromatography, (Springer, 1999). For polystyrene $K=1.38\times10^{-4}$ dl/g and $\alpha=0.7$; and for polyethylene $K=5.05\times10^{-4}$ dl/g and $\alpha=0.693$ were used. For a polymer fraction, which eluted at a temperature step, that has a weight fraction (weight % recovery) of less than 0.5%, the MWD and the molecular weight averages were not computed; additionally, such polymer fractions were not included in computing the MWD and the molecular-weight averages of aggregates of fractions.

Thermal Shrinkage

Thermal shrinkage represented by Linear Skein Shrinkage was measured in accordance with ASTM D 2259. Skeins of yarn were produced by winding 50 turns of yarns from bobbins onto a standard size denier test wheel. The skeins (loops) were suspended from a hook, and a weight of 90 g applied to the skein to hold it vertical. The length of the skein was measured using an mm-graduated ruler and recorded as initial length $L_0$. The weight was removed, skeins hung for 15 seconds in a circulating air oven at 100° C. then removed. Skeins were suspended from a hook, the 90 gram weight re-hung, and the length of the skein measured using a mm-graduated ruler. The length was recorded as "final length" $L_1$ and was consistently shorter than the initial length.

$$\text{Linear Skein Shrinkage (LSS)} = (L_0 - L_1) \ast 100 / L_0 \quad (1)$$

Yarns were produced using the Partially Oriented Yarn (POY) production equipment. Seventy-two (72) filament yarns were produced having filaments approximately 1.5 denier per filament. Fiber production speeds were within a range from 1000 m/min to 5000 m/min. Sample yarns were wound onto bobbins for subsequent testing.

Melting Point Temperature ($T_m$)

The melting point temperature ($T_m$) was measured by Differential Scanning Calorimetry (DSC) using a TA Instruments 2920 DSC. From 6 to 10 mg of the sample that has been stored at 22° C. for at least 48 hours was sealed in an aluminum pan and loaded into the instrument at 22° C. The sample was equilibrated at 25° C., then cooled at a cooling rate of 10° C./min to −80° C. to obtain heat of crystallization (Tc). Then the sample was held at −80° C. for 5 min and then heated at a heating rate of 10° C./min to 25° C. The glass transition temperature (Tg) was measured from this heating cycle. Otherwise, the sample was equilibrated at 25° C., then heated at a heating rate of 10° ° C./min to 150° C. The endothermic melting transition, if present, was analyzed for onset of a transition and peak temperature. The melting point temperatures reported ($T_m$) and heat of fusion (Hf) are the peak melting temperatures from the second heat unless otherwise specified. For samples displaying multiple peaks, the $T_m$, is defined to be the peak melting temperature (i.e., associated with the largest endothermic calorimetric response in that range of temperatures) from the DSC melting trace. The $T_m$ was measured to within ±0.2° C. The thermal output, recorded as the area under the melting peak of the sample, is a measure of heat of fusion (Hf) and can be expressed in Joules per gram (J/g) of polymer.

Inventive Spunbond Fabric

Inventive example A comprising ExxonMobil PP3155 (MFR of 36 g/10 min, MWD=3.8, Mw=170,000 g/mole, Mn=47,000 g/mole, and Mz=370,000 g/mole) as the primary polypropylene and polyethylene ("PE," ExxonMobil Enable™ 35-05) as the secondary polyolefin described in Table 2 was prepared according to the following general procedure. The melt blended polymer composition was fed into the fiber spinning extruder. The fiber spinning was carried out in a conventional fiber spinning line under partially oriented yarn mode. It was equipped with a two inch diameter single screw extruder. The molten polymer composition from the extruder was fed to a melt pump, which delivers the molten polymer composition to a spinneret. The spinneret contained 72 capillaries, each with a diameter of 0.6 mm. The molten polymer composition exiting the spinneret was quenched by the cold air at 15.6° C. and at the speed of 18.3 m/min. The quenched fiber was taken up by a mechanical roll (or godet) which can be varied from 0 to 5000 m/min, and two spinning speeds were set, 2500 m/min and 3500 m/min.

Comparative example was also prepared following the same procedure. Thermal shrinkage of each sample was calculated as shown in Table 1. The thermal shrinkage of inventive example A is more than 9. If bi-constituent phase of the polymer composition of the inventive example A can be formed during the process, thermal shrinkage can be increased up to 28. It can be seen from Table 1 that spinning speed is more fast, then the thermal shrinkage is much higher.

TABLE 1

Thermal Shrinkage of Inventive Examples at Different Spinning Speed

| Example No. | Comparative example PP3155 | inventive example A 95 wt % PP3155 + 5 wt % PE |
|---|---|---|
| 2500 m/min | 6.9 | 7.3 |
| 3500 m/min | 7.0 | 9.2 |

In a second set of examples, an ethylene-based polymer ("PE", ExxonMobil Enable™ 35-05) and a propylene-based elastomer ("PBE", Vistamaxx™ 6202 propylene-based elastomer) were selected as the secondary polyolefin of the polymer compositions as shown in Table 2.

TABLE 2

Properties of Base Materials of the Polymer Compositions

| Properties | PP3155 | PBE | PE |
|---|---|---|---|
| MFR (g/10 min) | 36 | 20 | 0.5 |
| Density (g/cm$^3$) | 0.91 | 0.86 | 0.94 |
| Tm (° C.) | 168.5 | 57 | 123.3 |
| MWD | 3.8 | 3.4 | 3.3 |

A blend of PP3155 (primary polypropylene) and the PBE or PE (secondary polyolefin) may be dry blended and fed directly into the extruder of the spunbond process to form inventive examples B to E. The melt blended polymer composition is fed into the extruder of a spunbond system. The output rate can range from 0.2 to 0.4 gram/hole/min, depending on the desired fiber size. The extruder of the spunbond system delivered the homogenized molten to a melt pump, which delivered the molten polymer to the spin beam. The spin beam had approximately a 1 meter wide rectangular spinneret having approximately 4000 holes. Each hole had a diameter of 0.6 mm. The molten polymer thread exiting the spinneret was quenched and drawn down into fine fibers by the cold air (less than 15.6° C.). The quenched and highly drawn fibers were deposited on a moving porous web (forming web) to form a mate of nonwoven web. The unbonded web was then passed through a calender roll which is heated to approximately 93° C. As the web was passed through the nip of the calender, the fiber was annealed, in a single step, and the elasticity of the fiber was enhanced.

Thermal shrinkage of all the samples was shown in Table 3. It is apparent that the inventive fabrics have a thermal shrinkage higher than that of the fabric of primary polypropylene alone, for example at least higher than 5%, preferably 10%, or 20%, or 25%, or 30%, or 35%, or 40%, or 50%.

TABLE 3

Thermal Shrinkage of Inventive Examples at Different Composition Ratios

| Example No. | Comparative | inventive examples | | | |
| | | B | C | D | E |
|---|---|---|---|---|---|
| PP3155 wt % | 100 | 80 | 85 | 90 | 92.5 |
| PBE wt % | — | 20 | 15 | 10 | — |
| PE wt % | — | — | — | — | 7.5 |
| Thermal Shrinkage | 7.4 | 8.7 | 7.8 | 7.4 | 10.2 |
| Enhanced Percentage % | — | 17.6 | 5.4 | 0 | 37.8 |

The various descriptive elements and numerical ranges disclosed herein can be combined with other descriptive elements and numerical ranges to describe preferred embodiments of the fabrics and laminates, and methods of forming them; further, any upper numerical limit of an element can be combined with any lower numerical limit of the same element to describe preferred embodiments, including values in the examples in jurisdictions that allow such. In this regard, the phrase "in (or "within") a range from X to Y" is intended to include the "X" and "Y" end values.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process for producing a nonwoven fabric comprising:
   a) forming a polymer composition comprising a primary polypropylene and at least one secondary polyolefin;
   b) in a spunbond process, forming fibers then fabric from the polymer composition;
   c) exposing the fabric to a cooling environment to a temperature below 50° C.; and
   d) exposing the fabric to a heating environment within a range from 50° C. to 250° C.

2. The process of claim 1, wherein the cooling environment comprises cooling air.

3. The process of claim 1, wherein the primary polypropylene has a molecular weight distribution (MWD) of less than 5.5 and a melt flow rate within a range from 1 to 500 g/10 min (ASTM D1238, 2.16 kg, 230° C.).

4. The process of claim 1, wherein the primary polypropylene is present in a polymer composition within a range from 98 to 50 wt %, based on the weight of the polymer composition, and the secondary polyolefin is present within a range from 2 to 50 wt %, based on the weight of the polymer composition.

5. The process of claim 1, wherein the secondary polyolefin is a propylene-based elastomer having at least 60 wt % propylene-derived structural units and 3 to 25 wt % ethylene-derived structural units, based on weight of the propylene-based elastomer, and a heat of fusion of less than 80 J/g.

6. The process of claim 1, wherein the secondary polyolefin is an ethylene-based polymer derived from ethylene and optionally one or more C3 to C20 α-olefin comonomers, wherein the ethylene-based polymer has a density within a range from 0.900 to 0.945 g/cm$^3$, a melt index (MI), $I_{2.16}$, within a range from 0.1 to 15 g/10 min, a MWD within a range from 1.5 to 5.5, and a melt index ratio (MIR), $I_{21.6}/I_{2.16}$, within a range from 10 to 100.

7. The process of claim 1, wherein the fibers have a thermal shrinkage at least 5% higher than the thermal shrinkage of the primary polypropylene alone, as determined in accordance with ASTM D2259.

8. The process of claim 1, wherein the fibers have a thermal shrinkage at least 20% higher than the thermal shrinkage of the primary polypropylene alone, as determined in accordance with ASTM D2259.

9. The process of claim 1, wherein the fibers have a thermal shrinkage of more than 10, as determined in accordance with ASTM D2259, after being spun at a spinning speed of 2500 m/min.

10. The process of claim 1, wherein the fibers have a thermal shrinkage of more than 20, as determined in accordance with ASTM D2259, after being spun at a spinning speed of 3500 m/min.

11. The process of claim 1, wherein the fibers have an average diameter of less than 20 μm, or a denier (g/9000 m) of less than 2.

12. The process of claim 1, wherein the primary polypropylene is produced by using a Ziegler-Natta catalyst system.

13. The process of claim 1, wherein the primary polypropylene has a MWD within a range from 3 to 4.5, as determined by GPC.

14. The process of claim 1, wherein the primary polypropylene has a melt flow rate within a range from 10 to 250 g/10 min, as determined in accordance with ASTM 1238, 2.16 kg at 230° C.

* * * * *